United States Patent [19]
Thumm et al.

[11] Patent Number: 5,332,344
[45] Date of Patent: Jul. 26, 1994

[54] SPINDLE HEAD FOR TOOL TURRET

[75] Inventors: Helmut Thumm; Friedrich Handel, both of Metzingen, Fed. Rep. of Germany

[73] Assignee: Sauter Feinmechanik GmbH, Metzingen, Fed. Rep. of Germany

[21] Appl. No.: 109,074

[22] Filed: Aug. 19, 1993

[30] Foreign Application Priority Data

Aug. 31, 1992 [DE] Fed. Rep. of Germany ....... 4228946

[51] Int. Cl.⁵ ............................................. B23Q 5/00
[52] U.S. Cl. ..................................... 409/230; 29/40; 408/238
[58] Field of Search ...................... 29/40, 39; 409/230, 409/231, 232, 234; 408/239 R, 239 A, 238

[56] References Cited

U.S. PATENT DOCUMENTS

| | | |
|---|---|---|
| 1,479,706 | 1/1924 | Fleischer . |
| 3,845,532 | 11/1974 | Smith ........................................ 29/40 |
| 5,168,614 | 12/1992 | Thumm ..................................... 29/40 |
| 5,188,493 | 2/1993 | Heel et al. ............................... 409/230 |
| 5,240,360 | 8/1993 | Esser ................................... 409/231 X |

FOREIGN PATENT DOCUMENTS

| | | | |
|---|---|---|---|
| 302998 | 2/1989 | European Pat. Off. ............... 29/40 |
| 3708227 | 9/1988 | Fed. Rep. of Germany . | |
| 3730561 | 11/1988 | Fed. Rep. of Germany . | |
| 3930121 | 1/1991 | Fed. Rep. of Germany . | |
| 530760 | 1/1977 | U.S.S.R. ............................ 409/230 |
| 673421 | 7/1979 | U.S.S.R. ............................ 409/230 |

Primary Examiner—William Briggs
Attorney, Agent, or Firm—Roylance, Abrams, Berdo & Goodman

[57] ABSTRACT

A spindle head for a tool turret has a housing in which a spindle is mounted rotatably. A rotation lock for the spindle includes a bushing arranged to be longitudinally slidable but nonrotatable on the spindle. A securing element is provided on the bushing. The bushing securing element, in its work setting, engages a securing element on the housing, limiting the axial movement of the bushing relative to the housing in the direction of the form-locking engagement of the two securing elements, and can be disengaged by an axial movement of the bushing counter to the force of a prebiased spring in a direction away from the housing securing element. At least some of the cooperating surfaces of the securing elements in the work setting are inclined with respect to the axial direction to a degree that excludes self-locking.

7 Claims, 2 Drawing Sheets

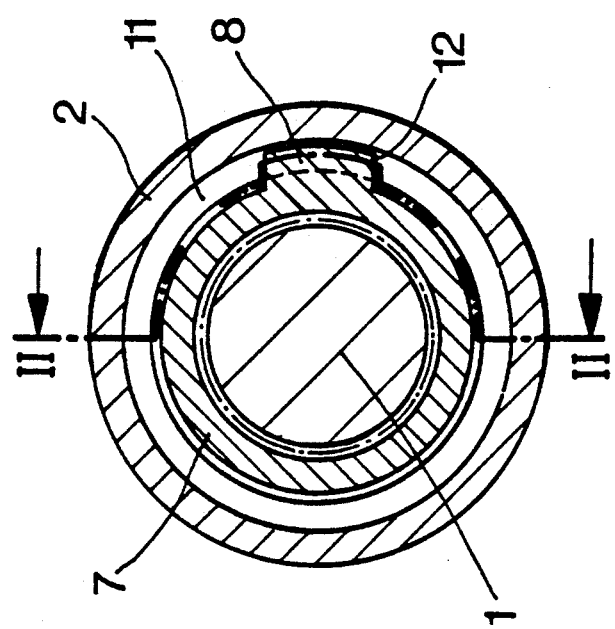
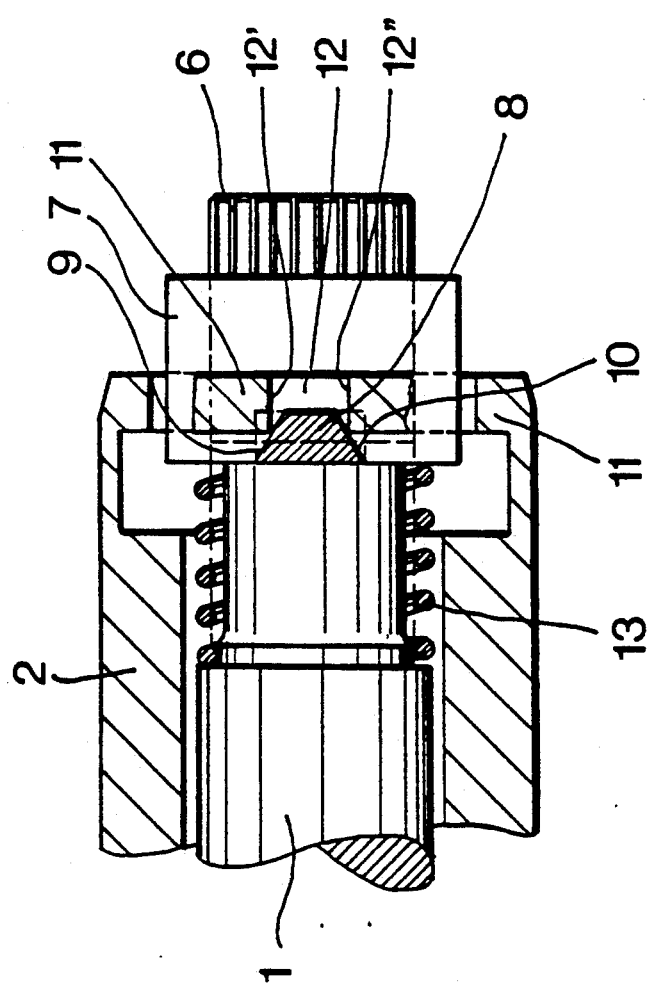

SPINDLE HEAD FOR TOOL TURRET

FIELD OF THE INVENTION

The present invention relates to a spindle head for a tool turret with a housing in which a spindle is mounted rotatably. The spindle cam be prevented from rotating in the housing by a rotation locking means comprising a bushing longitudinally slidable, but nonrotatable, on the spindle. The bushing has a securing element, which in its work setting, limits the axial movement of the bushing in one axial direction by form-locking, and engages a recess in the housing. The bushing securing element can be disengaged from the recess by axial movement of the bushing in the opposite axial direction against the force of a prebiased spring.

BACKGROUND OF THE INVENTION

In the case of a spindle head without a rotation lock (see, for example, German 39 30 121 C1), the spindle cannot be coupled by means of a simple form-locking coupling with the drive shaft. The spindle can also move into rotary settings in which the coupling elements are not aligned with one another, as is required for coupling.

With known spindle heads of the aforementioned type, one end of the bushing has a radially outwardly projecting annular flange. The flange has either a bolt extending in an axial direction or a catch with limiting surfaces extending in an axial direction, serving as the securing element. The housing is provided with a borehole or groove to receive the bolt or catch. Thus, the spindle retains the predetermined rotary setting taken upon uncoupling of the spindle from the drive shaft. This construction not only allows for a problem-free coupling, but also is often an indispensable condition for automatic replacement of the spindle head.

However, with these known spindle heads, the rotation lock can be misused as a counterhold element during tightening or as a chuck for the tool to be connected with the spindle, to avoid attaching a key or spanner to the spindle and using this key or spanner as a counterhold element during the tightening down movement. As a result of such misuse of the rotation lock, the bolt or catch can be broken off or damaged, such that the spindle can no longer be aligned properly with the housing.

SUMMARY OF THE INVENTION

Objects of the present invention involve providing a spindle head with a rotation lock that is not exposed to the danger of damage or destruction.

The foregoing objects are obtained by a spindle head for a tool turret comprising a housing having a first securing element and a spindle rotatably mounted in the housing. A bushing is coupled to the spindle to be longitudinally slidable, but nonrotatable, relative to the spindle. The bushing has a second securing element. In a work setting of the bushing, axial movement of the bushing relative to the housing is limited in one axial direction by engagement of the first and second securing elements. A prebiased spring biases the bushing in the one axial direction, but allows axial movement of the bushing in the opposite axial direction against the biasing force of the spring to disengage the first and second securing elements. Cooperating surfaces on the first and second securing elements precludes self-locking of the first and second securing elements in the work setting, as the surface of at least one of the first and second securing elements is inclined relative to the axial directions.

Since at least one surface of the cooperating surfaces of the securing elements forms an angle with the axial direction that exceeds the self-locking threshold, the torque which can be transmitted through the securing elements is limited in a simple manner to a level which precludes the possibility of damage or destruction. If the top or maximum limit of the torque being transferred is exceeded, the second securing element is moved in axial direction against the prebiased spring until it is out of engagement with the first securing element.

Another considerable advantage of the present invention results from the oblique surface. Specifically, the rotation lock operates without play, and, as a result, holds the spindle tightly in a certain predetermined position relative to the housing. Without requiring any precise adjustment means, the coupling profile traditionally provided on the spindle is aligned precisely with the profile of the coupling matching part.

If the rotation lock is exposed only in the one rotary direction to a torque upon connection or disconnection of a tool to one from the spindle, a single oblique surface is adequate to prevent the system from exceeding a top limit value of the torque in this direction. For the torque in the opposite direction, two opposite surfaces can then extend obliquely in the axial direction, without losing any of the freedom of play.

Generally, with the connection and disconnection of the tool to or from the spindle, a torque occurs in one direction or the other direction counter to the rotation lock. As a result, in one preferred embodiment one oblique surface is provided for each of two directions of rotation.

In principle, it is not critical whether the oblique surface or surfaces are provided on one or the other securing element. But, as is the case in one preferred embodiment, if the one securing element has the shape of a tooth and the other the shape of a recess, then, considering manufacturing costs, it is preferable that the recess be configured as a groove in the housing with axially extending limiting surfaces and that the oblique surface or surfaces be provided on the tooth. The groove in which the tooth engages must be of smaller width than the tooth base width measured around the circumference and of greater width than the tooth apex width measured around the circumference.

A further advantage of the spindle head according to the present invention is that no additional parts are required to make up the rotation lock. Therefore, the other spindle head parts do not need to be modified in their construction.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is an end elevational view in section of the spindle head of FIG. 1 taken along line II—II of FIG. 3; and FIG. 3 is an enlarged, partial side elevational view in section of the spindle head of FIG. 1 taken along line III—III of FIG. 1.

DETAILED DESCRIPTION OF THE INVENTION

Figure 1:
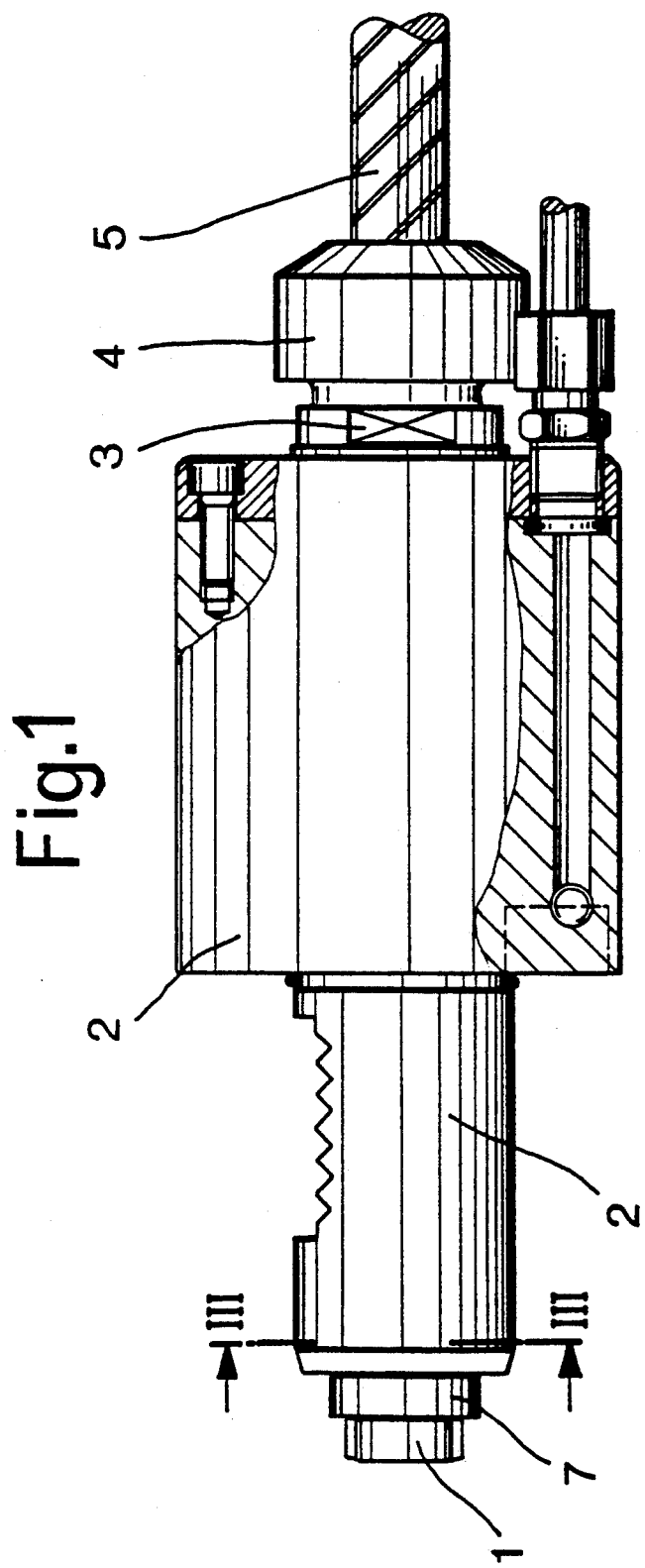
FIG. 1 is a side elevational view, partially in section, of a spindle head for a tool turret according to one embodiment of the present invention.

A spindle head for a tool turret has a spindle 1 mounted rotatably and axially unslidable or fixed in a housing 2. A first end of spindle I extending axially beyond one end of housing 2 has two diametrically opposite bevelled surfaces 3, in order to be able to attach a fork spanner (or fork wrench) thereto. This end of spindle 1 also supports a collet or pliers, in which a tool 5 can be mounted by rotation of an adjusting or tightening nut 4.

The second end of spindle 1 extends axially beyond the other end of housing 2 and has a coupling tooth arrangement in the form of a profiled splined shaft 6 (FIG. 2). Splined shaft 6 carries an axially slidable bushing 7 having an inside profile corresponding with the coupling tooth arrangement of splined shaft 6 and engaging in this coupling tooth arrangement. As shown in FIGS. 2 and 3, a tooth 8 is formed on the outside of bushing 7, actually in the end segment of the bushing lying inside housing 2. This tooth extends in axial direction and is limited peripherally by acutely angled flanges 9 and 10. Tooth 8 thus has a trapezoidal profile. The angle that the two flanges 9 and 10 form with the axis, with respect to axial alignment, is considerably greater than the threshold angle of the self-locking area. In the exemplary embodiment, the two flanges 9 and 10 are both at angles of 30 degrees with respect to the axial line, so that they enclose an angle of 60 degrees and define a symmetrical tooth profile.

For engaging tooth 8, a radially inwardly projecting flange 11 at the adjacent end of housing 2 is provided with an open groove 12 extending axially in the flange 11 and opening radially inwardly. Groove 12 has a rectangular cross-sectional profile. Two flanks 12' and 12" limit the groove peripherally, and extend parallel to one another in the axial direction. As shown in FIG. 2, the arcuate distance between the two flanks 12' and 12", around the circumference of flange 11, is smaller than the base width of tooth 8 circumferentially, but is greater than the apex width of tooth 8 in this same direction. Tooth 8 can therefore penetrate into groove 12 for only a part of its axial length. By this means, it is guaranteed that tooth 8, when it is located in its engagement or work setting (i.e., engaged in groove 12), engages without any play on both flanks 12' and 12" of groove 12.

A prebiased helical spring 13, surrounding spindle 1 and propped against a shoulder thereof, is supported on its other end on the surface of bushing 7 located inside housing 2. Spring 13 tries to hold the rotation lock, formed by bushing 7, tooth 8 and groove 12, in the work setting, in which spindle 1 remains in a precisely predetermined rotary setting in relation to housing 2.

Since bushing 7 in the work setting of the rotation lock and the end of spindle 1 provided with coupling tooth arrangement 6 project out of housing 2, the rotation lock is released automatically by an axial thrust of bushing 7 counter to the force of helical spring 13, when the end of spindle 1 is introduced into a coupling matching part. This female coupling matching part is provided with an inside profile corresponding with the non-circular profile of said second end of spindle 1 and with a shoulder. This shoulder pushes bushing 7 in its released setting when the second end of spindle 1 is introduced into said coupling matching part until its shoulder is in contact with said other end of housing 2.

Release of the rotation lock can also occur when a key is not applied to spindle 1 in the area of its bevelled surfaces 3 to oppose closing or opening of the collet or pliers. The rotation lock can transmit only a limited torque. This torque is limited by the force of helical spring 13 and the angle of inclination of flanges 9 and 10 to a value presenting no danger of damage to flanges 9 and 10 of tooth 8 or to flanks 12' and 12" of the groove. Since no self-locking is provided between tooth 8 and groove 12 when the torque effecting the rotation lock exceeds the predetermined value, tooth 8 is pulled out of groove 12, and bushing 7 is thrust further into housing 2 counter to the force or bias of helical spring 13 until tooth 8 is disengaged or removed completely from groove 12.

The inside diameter of flange 11 of housing 2 is selected to be sufficiently large that bushing 7 can be introduced into housing 2 from the end of the housing formed by flange 11, before the end segment of spindle 1 provided with coupling tooth arrangement 6 has been inserted through bushing 7. Since spring 13 can also be slid onto spindle 1 from the spindle end provided with coupling tooth arrangement 6, the mounting or assembly is quite simple.

Flange 11 can be configured as one piece with housing 2. Thus, flange 11 need not be configured, as with the conventional spindle heads, as a covering which is screwed together with the housing.

While a particular embodiment has been chosen to illustrate the invention, it will be understood by those skilled in the art that various changes and modifications can be made therein without departing from the scope of the invention as defined in the appended claims.

What is claimed is:

1. A spindle head for a tool turret, comprising:
   a housing having a first securing element;
   a spindle rotatably mounted in said housing;
   a bushing coupled to said spindle to be longitudinally slidable, but nonrotatable, relative to said spindle, said bushing having a second securing element engaging said first securing element in a work setting of said bushing, axial movement of said bushing relative to said housing being limited in one axial direction by engagement of said first and second securing elements;
   a prebiased spring biasing said bushing in said one axial direction, but allowing axial movement of said bushing in an opposite axial direction against a biasing force of said spring to disengage said first and second securing elements; and
   cooperating surfaces on said first and second securing elements precluding self-locking of said first and second securing elements in the work setting, at least one of said surfaces of said first or second securing elements being inclined relative to said axial directions.

2. A spindle head according to claim 1 wherein
   one of said securing elements comprises an axially extending tooth with a first inclined flank forming one of said cooperating surfaces being inclined; and
   the other of said securing elements comprises an axially extending recess.

3. A spindle head according to claim 2 wherein said tooth comprises a second flank extending in an axial direction.

4. A spindle head according to claim 2 wherein said tooth comprises a second inclined flank forming another of said cooperating surfaces being inclined, said first and second flanks being oppositely inclined.

5. A spindle head according to claim 2 wherein said recess is defined by axially extending surfaces spaced by a distance in a circumferential direction less than a greatest width of said tooth in a circumferential direction between said flanks.

6. A spindle head according to claim 2 wherein said first securing element is said recess; and said second securing element is said tooth.

7. A spindle head according to claim 6 wherein said housing comprises a radially inwardly extending flange having a groove therein forming said recess, said flange being unitarily formed as one piece with said housing; and said flange has an inside diameter greater than an outside diameter of said bushing at said tooth.

* * * * *